United States Patent Office

PTO - BOYERS, PA Duty Station

MISSING PAGE TEMPORARY NOTICE

PATENT # X856 FOR ISSUE DATE 4-23-1808

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing

Data Conversion Operation

Boyers, Pa

April 23 1808

Roswell Pitkin
Letters Patent

The Schedule referred to in these Letters Patent and making part
of the same containing a description in the words of the said Ros-
well Pitkin himself of his methods of manufacturing Hats Cloths
&c by making them from a fleece or sheet taken from a carding
Engine without bowing.

The materials to be wrought into Hats, Spreads &c. are prepared on
a Carding machine as in common use in cotton Factories and
the fleece or sheet formed on the drum cylinder is to be used &
applied in the manner following, viz.

When the fleece is taken from the cylinder it is to be spread
out, and upon the fleece and upon the fleece or sheet thus
spread patterns of various forms, such as circular, triangular
conical &c &c according to the fashion and size of the Hat or other
article to be made, are placed and pieces of various sizes, shapes
and dimensions, are to be taken out of the fleece or sheet suit-
able to form the Hat, or other article intended to be made
together with pieces for bands stoppings &c. which pieces or
shapes are to be wrought together by placing them in cloths with
suitable attention to the grain and pressing rolling and moving
them upon a plate or plates, heated and sprinkled, by which
operation or process they are united to each other into the prop-
er shapes or bodies for the purposes aforesaid, and are then to
be reduced to sufficient firmness, by sizing by basoning planking &c ac-
cording to art.

Witnesses
Samuel Pitkin
Sarah Pitkin [illegible]

Roswell Pitkin (288 words) (Patented 23. april 1808.)